United States Patent
Zhang et al.

(10) Patent No.: US 10,204,578 B2
(45) Date of Patent: Feb. 12, 2019

(54) DISPLAY SUBSTRATE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Kan Zhang, Beijing (CN); Bin Zhang, Beijing (CN); Dianzheng Dong, Beijing (CN); Guangxing Wang, Beijing (CN); Qiang Zhang, Beijing (CN); Yu He, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/529,898

(22) PCT Filed: Nov. 11, 2016

(86) PCT No.: PCT/CN2016/105455
§ 371 (c)(1),
(2) Date: May 25, 2017

(87) PCT Pub. No.: WO2017/118215
PCT Pub. Date: Jul. 13, 2017

(65) Prior Publication Data
US 2018/0047358 A1    Feb. 15, 2018

(30) Foreign Application Priority Data

Jan. 5, 2016    (CN) .......................... 2016 1 0005358

(51) Int. Cl.
*G09G 3/36*    (2006.01)
*G02F 1/133*    (2006.01)
(Continued)

(52) U.S. Cl.
CPC ....... *G09G 3/3674* (2013.01); *G02F 1/13306* (2013.01); *G02F 1/13338* (2013.01);
(Continued)

(58) Field of Classification Search
CPC .. G09G 3/3674; G09G 3/3677; G09G 3/3648; G09G 3/3659; G09G 2330/026;
(Continued)

(56) References Cited

U.S. PATENT DOCUMENTS 6,504,523 B1 *   1/2003   Sugawara ......... G02F 1/133514
                                                    345/98
2002/0080133 A1   6/2002   Eu
(Continued)

FOREIGN PATENT DOCUMENTS

CN    101882416 A    11/2010
CN    103472643 A    12/2013
(Continued)

OTHER PUBLICATIONS

International Search Report and Written Opinion in PCT/CN2016/105455 dated Dec. 29, 2016, with English translation.
(Continued)

*Primary Examiner* — David Tung
(74) *Attorney, Agent, or Firm* — Womble Bond Dickinson (US) LLP

(57) ABSTRACT

There are disclosed a display substrate and a display device. The display substrate comprises a common electrode line, a plurality of pixel units with each comprising a pixel electrode and a plurality of first switch units disposed respectively between the common electrode line and the pixel electrodes. Each of the first switch unit is configured to be turned on within a pre-set time period after the display substrate is powered off to connect the pixel electrode to the common electrode line and be turned off when the display (Continued)

substrate is powered on to disconnect the pixel electrode from the common electrode line. In this way, after the power-off, the charges stored in the pixel electrode are neutralized in the common electrode line. Thus, the pixel electrode and the common electrode can be discharged by the same discharge circuit, which guarantees no DC residue in the discharged pixel electrode.

10 Claims, 1 Drawing Sheet

(51) Int. Cl.
  *G02F 1/1362* (2006.01)
  *G02F 1/1333* (2006.01)
(52) U.S. Cl.
  CPC .... *G02F 1/13624* (2013.01); *G02F 1/136286* (2013.01); *G09G 3/3648* (2013.01); *G09G 3/3659* (2013.01); *G09G 3/3677* (2013.01); *G09G 2300/0426* (2013.01); *G09G 2330/026* (2013.01)
(58) Field of Classification Search
  CPC ........ G09G 2300/0426; G02F 1/13306; G02F 1/136286; G02F 1/13624; G02F 1/13338
  See application file for complete search history.

(56) References Cited

U.S. PATENT DOCUMENTS

| | | | |
|---|---|---|---|
| 2008/0165109 A1* | 7/2008 | Joo | G09G 3/3677 345/98 |
| 2015/0109282 A1 | 4/2015 | Chen et al. | |
| 2015/0189264 A1 | 6/2015 | Liao | |
| 2016/0372072 A1 | 12/2016 | Wu et al. | |
| 2017/0061917 A1 | 3/2017 | Chen et al. | |

FOREIGN PATENT DOCUMENTS

| | | |
|---|---|---|
| CN | 103676383 A | 3/2014 |
| CN | 104503113 A | 4/2015 |
| CN | 104849891 A | 8/2015 |
| CN | 104916263 A | 9/2015 |
| CN | 105096888 A | 11/2015 |
| CN | 105185293 A | 12/2015 |
| CN | 105489182 A | 4/2016 |
| CN | 205282061 U | 6/2016 |
| JP | 2003167561 A | 6/2003 |
| KR | 10-2008-0064928 A | 7/2008 |

OTHER PUBLICATIONS

Office Action in Chinese Application No. 201610005358.2 dated Jul. 14, 2017, with English translation.

\* cited by examiner

DISPLAY SUBSTRATE AND DISPLAY DEVICE

RELATED APPLICATIONS

The present application is the U.S. national phase entry of PCT/CN2016/105455 with an International filing date of Nov. 11, 2016, which claims the benefit of Chinese Application No. 201610005358.2, filed on Jan. 5, 2016, the entire disclosures of which are incorporated herein by reference.

TECHNICAL FIELD

The present disclosure relates to the field of display technology, and more particularly to a display substrate and a display device.

BACKGROUND ART

A conventional reset circuit after cutting off its power supply will pull up a gate drive output voltage to a high voltage (VGH) so as to turn on a TFT (thin film transistor) of each row of pixels for discharge. However, as a matter of fact, the TFTs of all rows cannot be turned on simultaneously, therefore the VGH received by the rows of pixels that are later turned on has been attenuated, thereby rendering it impossible to discharge effectively. In addition, after the voltage of the pixel electrode is neutralized to the common voltage, the final discharge circuit is different from the discharge circuit of the common electrode. Discharge through different circuits may result in that the discharging rate of the pixel electrode is slower than that of the common electrode, which leads to DC residue. For some ADS (Advanced Super Dimension Switch) product, the pixel electrode discharges slowly due to larger LCD capacitance, which may easily cause flicker shift during electrification.

SUMMARY

An embodiment of the present invention provides a display substrate comprising a common electrode line and a plurality of pixel units with each comprising a pixel electrode connected to the common electrode line. The display substrate further comprises a plurality of first switch units. Each of the first switch units is disposed between the common electrode line and the pixel electrode, and is configured to be turned on within a pre-set time period after the display substrate is powered off so as to connect the pixel electrode to the common electrode line, and configured to be turned off when the display substrate is powered on so as to disconnect the pixel electrode from the common electrode line.

In an exemplary embodiment, the first switch unit is disposed between a data line and the common electrode line.

In an exemplary embodiment, each pixel unit further comprises a driving transistor. The driving transistor comprises a driving source, a driving drain and a driving gate. The driving source is connected to the data line, the driving drain is connected to the pixel electrode, and the driving source and the driving drain are electrically conductively connected within a pre-set time period after the display substrate is powered off.

In an exemplary embodiment, each pixel unit further comprises a second switch unit disposed between the driving transistor and the pixel electrode. The second switch unit is configured to be turned on within a pre-set time period after the display substrate is powered off so as to connect the pixel electrode to the driving gate and configured to be turned off when the display substrate is powered on so as to disconnect the pixel electrode from the driving gate.

In an exemplary embodiment, the display substrate further comprises a gate driving integrated circuit and a third switch unit disposed between the gate driving integrated circuit and the driving transistor. The gate driving integrated circuit is configured to transmit a scanning signal to the driving gate when the display substrate is powered on. The third switch unit is configured to be turned off within a pre-set time period after the display substrate is powered off so as to disconnect the gate driving integrated circuit from the driving transistor and configured to be turned on when the display substrate is powered on so as to connect the gate driving integrated circuit to the driving transistor.

In an exemplary embodiment, the display substrate further comprises a control unit connected to an input terminal of the first switch unit, an input terminal of the second switch unit and an input terminal of the third switch unit. The control unit is configured to turn on the first switch unit and the second switch unit and turn off the third switch unit within a pre-set time period after the display substrate is powered off and configured to turn off the first switch unit and the second switch unit and turn on the third switch unit when the display substrate is powered on.

In an exemplary embodiment, the first switch unit comprises a plurality of first transistors. Each of the first transistors comprises a first source, a first drain and a first gate. The first source is connected to the common electrode line, the first drain is connected to a data line, and each first gate is connected to the control unit.

In an exemplary embodiment, the control unit is configured to output a high voltage within a pre-set time period after the display substrate is powered off and configured to output a low voltage when the display substrate is powered on.

In an exemplary embodiment, the second switch unit comprises a plurality of second transistors. Each of the second transistors comprises a second source, a second drain and a second gate. The second source is connected to the driving gate, the second drain is connected to the driving drain, and the second gate is connected to the control unit.

In an exemplary embodiment, the third switch unit comprises a NOT gate and a plurality of third transistors. The NOT gate comprises an input terminal and an output terminal, and each of the third transistors comprises a third source, a third drain and a third gate. The input terminal of the NOT gate is connected to the control unit, the output terminal of the NOT gate is respectively connected to each of the third gates, each of the third sources is connected to the gate driving integrated circuit, and each of the third drains is respectively connected to a gate line.

In an exemplary embodiment, the first switch unit and the third switch unit are disposed in a peripheral circuit.

In an exemplary embodiment, the pre-set time period ranges from 0.1 ms to 10 ms.

An embodiment of the present invention also provides a display device comprising the aforementioned display substrate.

BRIEF DESCRIPTION OF DRAWINGS

The features and advantages of some embodiments of the present invention can be understood more clearly with reference to the drawings. The drawings are schematically illustrated and shall not be understood as any limitation to the present invention, wherein.

DETAILED DESCRIPTION

To enable easy understanding of the above object, technical features and advantages of some embodiments of the present invention, these embodiments will be further described in detail in connection with the drawings and detailed description. It shall be explained that the embodiments and the features thereof in the present application can be combined with each other in case of no conflicts.

Many details will be presented in the following depiction so as to facilitate comprehensive understanding of the present invention. Nevertheless, the present invention can also be implemented by other manners different from those presented herein. Thus, the protection scope of the present invention is not limited to the following specific embodiments.

REFERENCE SIGNS

1—a common electrode lines; 2—a pixel unit; 20—a pixel electrode; 21—a first switch unit; 22—a second switch unit; 23—a third switch unit; 24—a driving transistor; 3—a data line; 4—a gate driving integrated circuit; 5—a control unit; 6—a data signal integrated circuit; and 7—a gate line.

Figure 1:
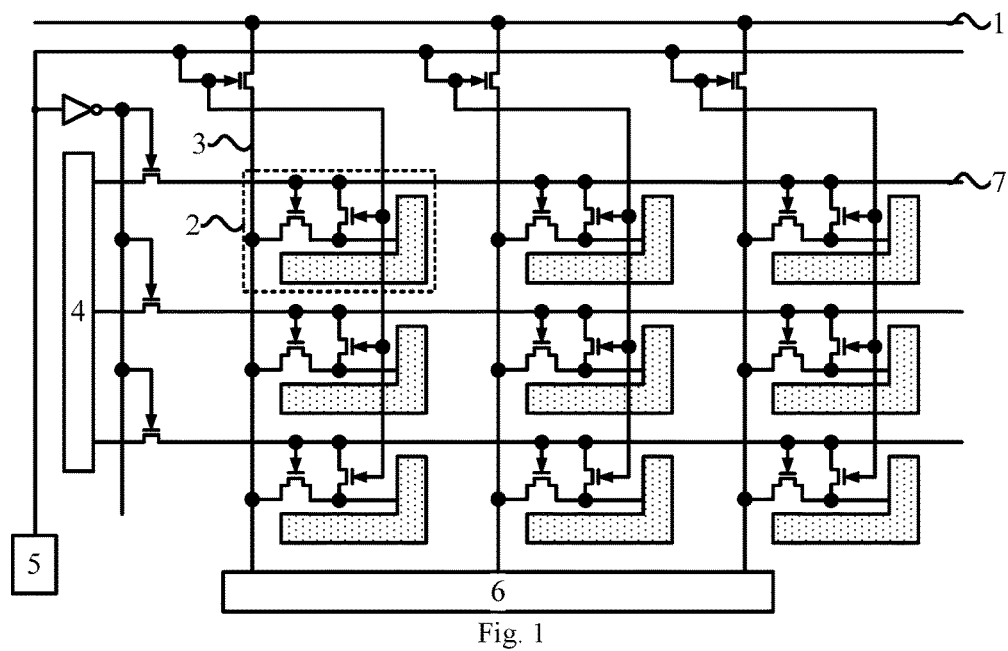
FIG. 1 is a schematic view illustrating a circuit in a display substrate according to an embodiment of the present invention.
Figure 2:
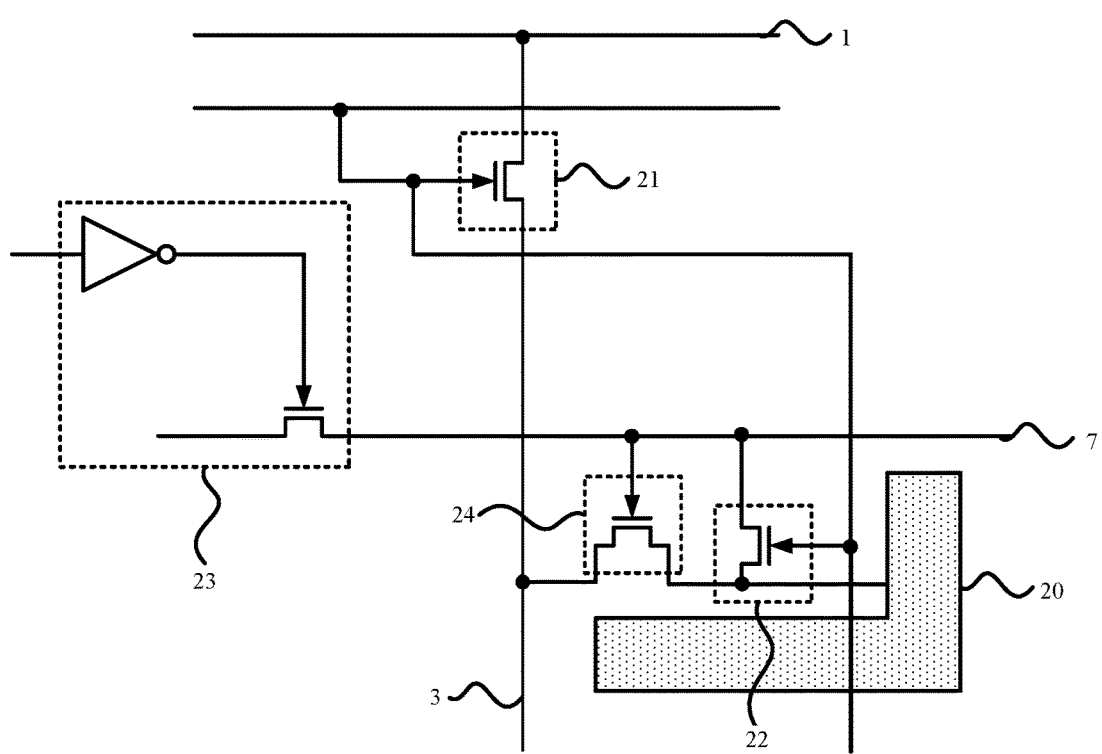
FIG. 2 is a partially enlarged schematic view of FIG. 1.

As shown in FIGS. 1 and 2, a display substrate according to an embodiment of the present invention comprises a common electrode line 1 and a plurality of pixel units 2. Each pixel unit 2 comprises a pixel electrode 20 connected to the common electrode line 1. The display substrate further comprises a first switch unit 21 disposed between the common electrode line 1 and the pixel electrode 20. The first switch unit 21 is configured to be turned on within a pre-set time period after the display substrate is powered off so as to connect the pixel electrode 20 to the common electrode line 1 and configured to be turned off when the display substrate is powered on so as to disconnect the pixel electrode 20 from the common electrode line 1.

In some embodiments, the pre-set time period is a time value set during the manufacturing process of the display substrate. In other embodiments, the pre-set time period is a time value that can be manually modified and set during the use of a product containing the display substrate. For instance, the pre-set time period is a time value between 0.1 ms and 10 ms, and the specific time value is decided by the discharge rate of the display substrate.

The present embodiment can connect the pixel electrode to the common electrode line by the first switch unit within a pre-set time period after the display substrate is powered off, such that, after the power-off, charges stored in the pixel electrode of each pixel unit are neutralized in the common electrode line. Thus, the pixel electrode and the common electrode can be discharged by the same discharge circuit, which guarantees no DC residue in the discharged pixel electrode.

For instance, as shown in FIG. 2, each pixel unit 2 further comprises a driving transistor 24. The driving transistor 24 comprises a driving source, a driving drain and a driving gate. The driving source is connected to a data line 3, the driving drain is connected to the pixel electrode 20, and the driving source and the driving drain are electrically conductively connected within a pre-set time period after the display substrate is powered off.

For instance, the first switch unit 21 is disposed between the data line 3 and the common electrode line 1.

In the present embodiment, the driving transistor 24 is controlled to be turned on within a pre-set time period after the display substrate is powered off so as to guide the charges in the pixel electrode 20 into the common electrode line 1. In this way, the original structure of the pixel unit 2 is sufficiently utilized as a connecting structure between the pixel electrode 20 and the common electrode line 1, thereby reducing the adjustment of the pixel unit 2.

In an exemplary embodiment, each pixel unit 2 further comprises a plurality of second switch units 22. Each second switch unit 22 is disposed between each driving transistor 24 and each pixel electrode 20. The second switch unit 22 is configured to be turned on within a pre-set time period after the display substrate is powered off so as to connect the pixel electrode 20 to the driving gate and configured to be turned off when the display substrate is powered on so as to disconnect the pixel electrode 20 from the driving gate.

In the present embodiment, the second switch unit 22 when turned on transmits the charges stored in the pixel electrode 20 to the driving gate of the driving transistor 24, so as to turn on the driving transistor 24 by making full use of the residual charges in the pixel electrode 20 after the power-off.

It shall be explained that different residual charges may be left in different pixel electrodes. For instance, for a pixel array with column inversion, different residual charges are left in pixel electrodes in adjacent columns. To be specific, the voltage of the pixel electrodes in adjacent columns is respectively at a high level or a low level, but is not negative. When the pixel electrode is connected to the driving gate of the driving transistor, the pixel electrode provides a turn-on voltage to the driving gate of the driving transistor within a certain time period, so as to electrically conductively connect the driving source and the driving drain of the driving transistor.

For instance, the display substrate further comprises a gate driving integrated circuit 4. The gate driving integrated circuit 4 is configured to transmit a scanning signal to the driving gate of the driving transistor 24 when the display substrate is powered on.

For instance, the display substrate further comprises a third switch unit 23. The third switch unit 23 is disposed between the gate driving integrated circuit 4 and the driving transistor 24. The third switch unit 23 is configured to be turned off within a pre-set time period after the display substrate is powered off so as to disconnect the gate driving integrated circuit 4 from the driving transistor 24 and configured to be turned on when the display substrate is powered on so as to connect the gate driving integrated circuit 4 to the driving transistor 24.

Since the second switch unit 22 electrically conductively connects the driving gate and the driving drain of the driving transistor 24, i.e., the gate line 7 and the pixel electrode 20, within the pre-set time, the third switch unit 23 can be turned off within a pre-set time period after the display substrate is powered off, so as to prevent the charges in the gate driving integrated circuit 4 from flowing into the pixel electrode 20 within the pre-set time period, which may cause damages to the pixel electrode 20.

For instance, the display substrate further comprises a control unit 5. The control unit 5 is connected to an input terminal of the first switch unit 21, an input terminal of the second switch unit 22 and an input terminal of the third switch unit 23. The control unit 5 is configured to turn on the first switch unit 21 and the second switch unit 22 and turn off the third switch unit 23 within a pre-set time period after the display substrate is powered off and configured to turn off the first switch unit 21 and the second switch unit 22 and turn on the third switch unit 23 when the display substrate is powered on.

In the present embodiment, the on-off state of the first switch unit, the second switch unit and the third switch unit can be uniformly controlled by a control unit so as to simplify the wire layout.

For instance, the first switch unit 21 comprises a plurality of first transistors. Each of the first transistors comprises a first source, a first drain and a first gate. Each of the first sources is connected to the common electrode line 1, each of the first drains is connected to a data line 3, and each of the first gates is respectively connected to the control unit 5.

The control unit 5 is configured to output a high voltage within a pre-set time period after the display substrate is powered off and configured to output a low voltage when the display substrate is powered on.

The control unit 5 in the present embodiment is configured to output a high voltage to the first gate of each first transistor within the pre-set time period so as to turn on each first transistor and thereby electrically conductively connect the common electrode line 1 on the side of the first source with the data line 3 on the side of the first drain and further electrically conductively connect the common electrode line 1 with the pixel electrode 20.

It shall be explained that the date line in the present embodiment may be the one located between two columns of the pixel units for transmitting data signals to one of the two columns of the pixel units, or the one located between two columns of the pixel units for transmitting data signals to every other pixel unit in the two columns of the pixel units. For instance, in a dual-gate structure, the data line transmits data signals to odd-numbered pixel units in a columns of the pixel units, and transmits data signals to even-numbered pixel units in the other columns of the pixel units.

For instance, the second switch unit 22 comprises a plurality of second transistors. Each of the second transistors comprises a second source, a second drain and a second gate. Each of the second sources is connected to the driving gate of the driving transistor 24, each of the second drains is connected to the driving drain of the driving transistor 24, and each of the second gates is connected to the control unit 5.

The control unit 5 outputs a high voltage to the gate of each second transistor within the pre-set time period so as to turn on each second transistor, thereby transmitting the charges of the pixel electrode 20 from the driving drain (namely, from the second drain of each second transistor) of the driving transistor 24 to the second source of each second transistor and then to the driving gate of the driving transistor 24 so as to turn on the driving transistor 24. The charges of the pixel electrode at the driving drain of the driving transistor 24 are led into the data line through the driving source and then into the common electrode line 1 through each of the first transistors.

Since one column of pixel electrodes is connected with the same data line and each data line is electrically conductively connected with the common electrode line when the first switch unit is turned on, the charges in each column of the pixel electrodes are led to the common electrode line for neutralization, and are led out, together with the charges in the common electrode line, through the same circuit, so as to ensure that no DC residues are left in each column of the discharged pixel electrodes.

For instance, as shown in FIG. 2, the third switch unit 23 comprises a NOT gate and a plurality of third transistors. It should be understood that for the sake of simplification, FIG. 2 only schematically shows one third transistor. The NOT gate comprises an input terminal and an output terminal. Each of the third transistors comprises a third source, a third drain and a third gate. The input terminal of the NOT gate is connected to the control unit 5, the output terminal of the NOT gate is connected to the third gate of each of the third transistors respectively, the third source of each of the third transistors is respectively connected to the gate driving integrated circuit 4, and the third drain of each of the third transistors is respectively connected to a gate line 7.

In some embodiments, the gate line 7 is the one located between two rows of the pixel units for transmitting scan signals to one of the two rows of the pixel units. In some other embodiments, the gate line 7 is the one located between two rows of the pixel units for transmitting scan signals to every other pixel unit in the two rows of the pixel units. For instance, the gate line 7 transmits scan signals to odd-numbered pixel units in a row of the pixel units, and transmits scan signals to even-numbered pixel units in the other row of the pixel units.

Within the pre-set time period, a high voltage outputted by the control unit is turned into a low voltage through the NOT gate so as to turn off the third transistor, thereby preventing the charges in the gate driving integrated circuit from flowing into the pixel electrodes within the pre-set time period. For similar reasons, after the display substrate is powered on, a low voltage outputted by the control unit is turned into a high voltage through the NOT gate so as to turn on the third transistor, thereby normally providing scanning signals to the pixel units.

In some embodiments, as stated above, the third switch unit comprises a NOT gate and a plurality of NPN-type third transistors. In other embodiments, the third switch unit directly consists of a plurality of PNP-type third transistors.

For instance, the first switch unit 21 and the third switch unit 23 are disposed in a peripheral circuit.

The peripheral circuit may be a circuit disposed between a frame and the display substrate for disposing a power source wire, the gate driving integrated circuit 4, the data signal integrated circuit 6 and the like. The present embodiment can effectively reduce the occupied size of the pixel area and increase an effective illuminating area. Furthermore, the peripheral circuit comprising the first switch unit 21 and the third switch unit 23 can be arranged as a flexible circuit so as to bend the flexible circuit into the backside of the display substrate when the display substrate is assembled into a display device, thereby reducing the occupied size of the planar space. Of course, the control unit 5 may also be arranged in the peripheral circuit so as to reduce the occupied size of the pixel area.

An embodiment of the present invention also provides a display device comprising the above display substrate.

It shall be explained that the display device in the present embodiment may be any product or component with a display function such as electronic paper, mobile phones, tablet computers, TVs, laptops, digital photo frames or navigators.

The technical solution of the embodiment of the present invention is explained in detail with reference to the drawings. In the prior art, the discharging circuit of the pixel electrode is different from that of the common electrode, which easily causes DC residues in the pixel electrode. According to the technical solution of the embodiment of the present invention, the first switch unit can electrically conductively connect the common electrode line with the pixel electrode within the pre-set time period after the display substrate is powered off, so that, after the power-off, all the charges stored in the pixel electrode are neutralized in the common electrode line. Thus, the pixel electrode and the common electrode can be discharged by the same discharge circuit, which guarantees no DC residue in the discharged pixel electrode.

In the embodiment of the present invention, the terms "first", "second" and "third" are only used for illustration, rather than for indicating or implying relative importance. The term "a plurality of" indicates two or more than two, unless otherwise specified.

The above depiction is only related to some exemplary embodiments of the present invention, but not used to limit the present invention. As far as those skilled in the art are concerned, the present invention may have various variations and modifications. Any modification, equivalent replacement or improvement made within the spirit and principle of the present invention shall be included in the protection scope of the present invention.

What is claimed is:

1. A display substrate comprising:
   a common electrode line; and
   a plurality of pixel units each comprising a pixel electrode connected to the common electrode line,
   wherein the display substrate further comprises a plurality of first switch units, each of the first switch units is disposed between the common electrode line and the pixel electrode, and is configured to be turned on within a pre-set time period after the display substrate is powered off so as to connect the pixel electrode to the common electrode line and configured to be turned off when the display substrate is powered on so as to disconnect the pixel electrode from the common electrode line,
   wherein the first switch unit is disposed between a data line and the common electrode line,
   wherein each pixel unit further comprises a driving transistor comprising a driving source connected to the data line, a driving drain connected to the pixel electrode, and a driving gate, the driving source and the driving drain being electrically conductively connected within the pre-set time period after the display substrate is powered off, and
   wherein each pixel unit further comprises a second switch unit disposed between the driving transistor and the pixel electrode, the second switch unit being configured to be turned on within the pre-set time period after the display substrate is powered off so as to connect the pixel electrode to the driving gate and configured to be turned off when the display substrate is powered on so as to disconnect the pixel electrode from the driving gate.

2. The display substrate according to claim 1, further comprising a gate driving integrated circuit and a third switch unit disposed between the gate driving integrated circuit and the driving transistor,
   wherein the gate driving integrated circuit is configured to transmit a scanning signal to the driving gate when the display substrate is powered on; and
   wherein the third switch unit is configured to be turned off within the pre-set time period after the display substrate is powered off so as to disconnect the gate driving integrated circuit from the driving transistor and configured to be turned on when the display substrate is powered on so as to connect the gate driving integrated circuit to the driving transistor.

3. The display substrate according to claim 2, further comprising a control unit connected to an input terminal of the first switch unit, an input terminal of the second switch unit and an input terminal of the third switch unit,
   wherein the control unit is configured to turn on the first switch unit and the second switch unit and turn off the third switch unit within the pre-set time period after the display substrate is powered off and configured to turn off the first switch unit and the second switch unit and turn on the third switch unit when the display substrate is powered on.

4. The display substrate according to claim 3, wherein the first switch unit comprises a plurality of first transistors, and each of the first transistors comprises a first source, a first drain and a first gate, and
   wherein the first source is connected to the common electrode line, the first drain is connected to a data line, and the first gate is connected to the control unit.

5. The display substrate according to claim 4, wherein the control unit is configured to output a high voltage within the pre-set time period after the display substrate is powered off and configured to output a low voltage when the display substrate is powered on.

6. The display substrate according to claim 3, wherein the second switch unit comprises a plurality of second transistors, and each of the second transistors comprises a second source, a second drain and a second gate, and
   wherein the second source is connected to the driving gate, the second drain is connected to the driving drain, and the second gate is connected to the control unit.

7. The display substrate according to claim 3, wherein the third switch unit comprises a NOT gate and a plurality of third transistors, the NOT gate comprises an input terminal and an output terminal, and each of the third transistors comprises a third source, a third drain and a third gate, and
   wherein the input terminal of the NOT gate is connected to the control unit, the output terminal of the NOT gate is respectively connected to each of the third gates, each of the third sources is connected to the gate driving integrated circuit, and each of the third drains is respectively connected to a gate line.

8. The display substrate according to claim 2, wherein the first switch unit and the third switch unit are disposed in a peripheral circuit.

9. The display substrate according to claim 1, wherein the pre-set time period ranges from 0.1 ms to 10 ms.

10. A display device comprising the display substrate according to claim 1.

* * * * *